United States Patent Office 3,606,764
Patented Sept. 21, 1971

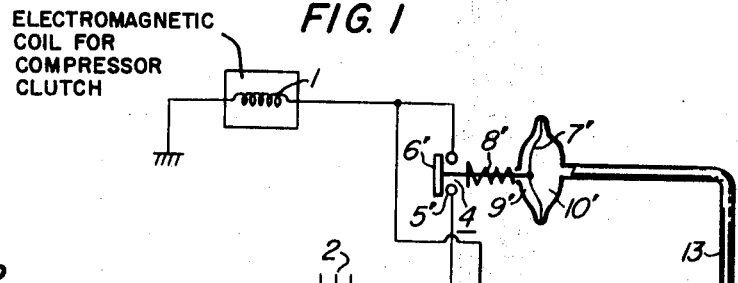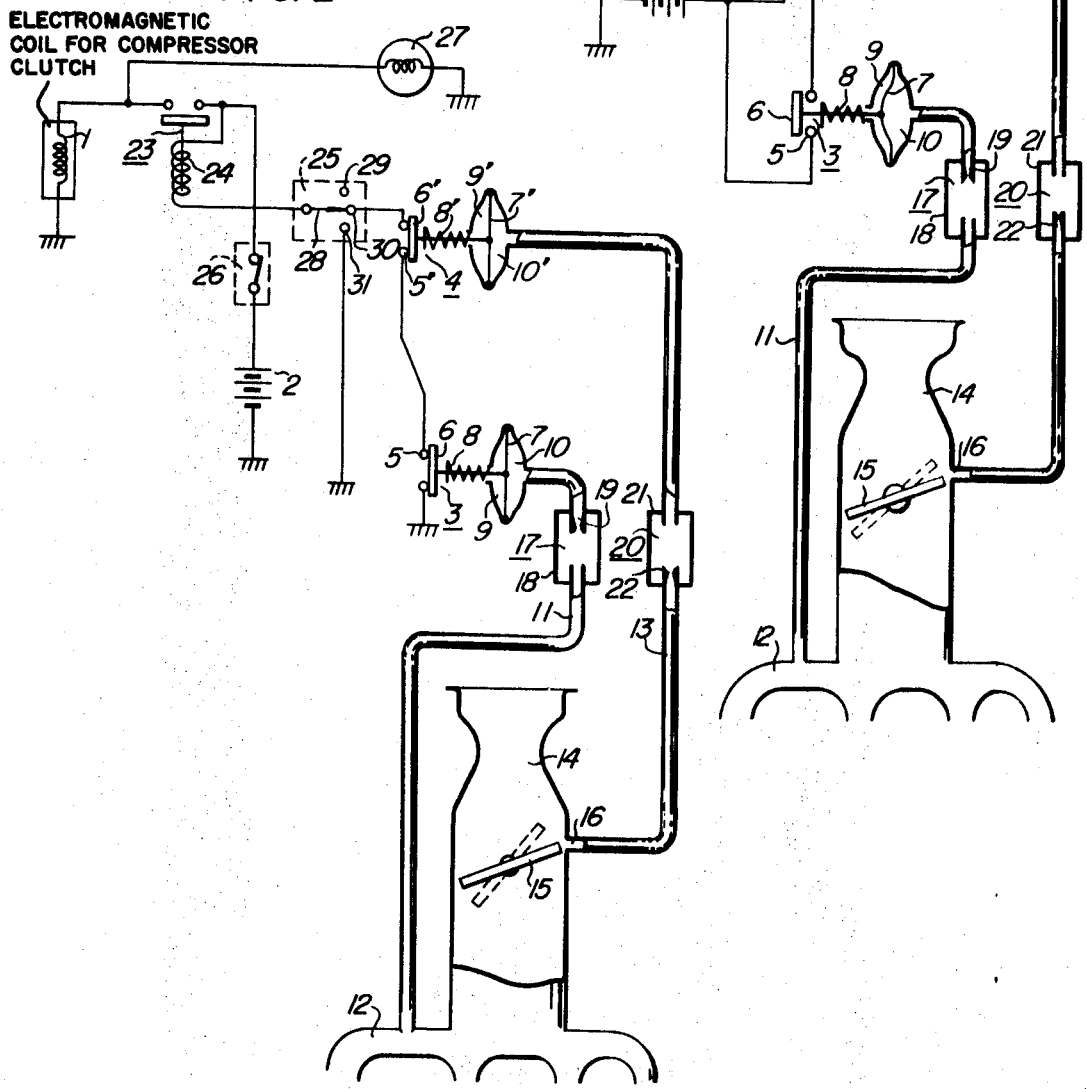

3,606,764
AUTOMATIC CLUTCH CONTROLLING SYSTEM FOR REFRIGERATING APPARATUS INSTALLED IN AUTOMOBILE
Naotadashi Yokouchi and Tosikatu Ito, Hitachi-shi, Japan, assignors to Hitachi, Ltd., Tokyo, Japan
Filed Apr. 17, 1969, Ser. No. 817,113
Claims priority, application Japan, Apr. 24, 1968, 43/33,013; May 22, 1968, 43/34,628; Aug. 26, 1968, 43/72,805
Int. Cl. F25b 27/00
U.S. Cl. 62—213                                     5 Claims

ABSTRACT OF THE DISCLOSURE

An automatic clutch controlling system for refrigerating apparatus installed in an automobile, including a first switch means adapted to be opened and closed in accordance with an eased change in a depression occurring in an intake manifold, and a second switch means adapted to be opened and closed in accordance with a change in a depression occurring in the neighborhood of a throttle valve of carbureter, said first and second switch means being inserted in an energization circuit associated with the coil of an electromagnetic clutch for connecting the compressor of the refrigerating apparatus installed in the vehicle with the engine to thereby disengage said electromagnetic valve for the purpose of stopping the driving of the refrigerating apparatus during the idling, quick-accelerating and high-power running operations.

BACKGROUND OF THE INVENTION

Field of the invention

This invention relates to an automatic clutch controlling system for a refrigerating apparatus installed in an automobile.

Description of the prior art

Refrigerating apparatus is very extensively installed in automobiles of a high engine capacity, whereas in the case of automobiles of a low engine-capacity, such apparatus is rarely installed since such automobiles have no margin in the output thereof and the running performance thereof tends to be deteriorated by the apparatus constituting a load. If such apparatus is installed at all, it is operated only during low-load running of the automobile. In the case of a low-capacity engine, however, it is during the idling operation, low-speed, heavy-load running operation, and quick-accelerating or high-speed running operation wherein it is desired to utilize the whole or a major portion of the engine output that the engine has no output to spare because of the limited engine cooling power. In most other running operations, the engine output has a sufficient margin to drive a refrigerating apparatus. In order to determine the time to operate a refrigerating apparatus installed in an automobile of a low engine-capacity, there have conventionally been proposed several methods of stopping the driving of the compressor by making use of changes in the throttle valve opening, engine speed, intake manifold depression, etc., during the idling operation, accelerating operation, high-power running operation and so forth. By these conventional methods, however, it is impossible to pertinently determine the time when the refrigerating apparatus should be stopped, by means of a simple arrangement. It may be considered that the means for detecting the running conditions can be simplified in construction and manufactured at low cost by such a design that variations in a depression occurring in the intake manifold, etc. are utilized. However, it is not proper to utilize such depression changes directly for the purpose of controlling the driving and stopping of the refrigerating apparatus. More specifically, the depression in the intake manifold varies all the time during the running of the automobile even within a short time, and in the case of accelerating running or high power-running, the magnitude of the depression varies accordingly, irrespective of the extent of the acceleration and length of time of the high power running. Furthermore, the manifold depression becomes higher in the coasting operation than in the idling operation, and when the gear is manipulated, too, it becomes, though only temporarily, higher than that during the idling operation. These conditions often tend to occur during the running of an automobile, and under such conditions it is not required to control the driving and stopping of the refrigerating apparatus each time.

SUMMARY OF THE INVENTION

It is a primary object of the present invention to provide a system for controlling a refrigerating apparatus installed in an automobile of low engine-capacity, which is adapted to automatically control the time when the refrigerating apparatus is to be operated in accordance with the running conditions of the automobile, thereby making the refrigerating apparatus work in any event so that the running of the automobile can be performed without any trouble.

Another object of the present invention is to provide such system wherein changes in a depression occurring in an intake manifold and in the vicinity of a throttle valve of carbureter are suitably eased and then utilized to determine the time when the refrigerating apparatus is to be stopped for the purpose of limiting the frequencies of operating and stopping the apparatus within the lowest range required, thereby increasing the life span of the equipment and reducing uncomfortable noise.

Still another object of the present invention is to provide a system for controlling the operation and stopping of a refrigerating apparatus and which can be simplified in construction and manufactured at low cost.

Other objects, features and advantages of the present invention will become apparent from the following description taken in conjunction with the accompanying drawings.

In accordance with the present invention, an electromagnetic clutch for connecting the compressor with the engine is controlled in accordance with a depression related to that occurring in an intake manifold and a depression related to that occurring in the neighborhood of a throttle valve of carbureter, thereby stopping the driving of the compressor only during the idling running, accelerating running and high-power running of the automobile.

BRIEF DESCRIPTION OF THE DRAWINGS

FIG. 1 is a diagrammatic view showing the automatic clutch controlling system for a refrigerating apparatus installed in an automobile according to a first embodiment of the present invention.

FIG. 2 is a diagrammatic view showing the clutch controlling system for a refrigerating apparatus installed in an automobile according to a second embodiment of the present invention.

DESCRIPTION OF THE PREFERRED EMBODIMENTS

In FIG. 1, numeral 1 represents an electromagnetic coil for connecting to an engine the compressor of a refrigerating apparatus installed in an automobile. Connected between this coil and a battery 2 are first and second switches 3 and 4 parallel to each other which comprise fixed contacts 5 and 5' and movable contacts 6 and 6' respectively. The movable contacts 6 and 6' are connected with diaphragms 7 and 7' respectively and normally opened by springs 8 and 8' respectively. On the left hand side of the diaphragms 7 and 7', there are defined chambers 9 and 9' on which the atmospheric pressure acts, and on the right hand side there are defined chambers 10 and 10'.

The chamber 10 of the first switch 3 communicates with an intake manifold 12 of the engine through a pipe 11, and the chamber 10' of the second switch 4 communicates with a pressure inlet port 16 provided in the neighborhood of a throttle valve 15 of a carbureter 14 through a pipe 13. The pressure inlet port 16 is located at such a position as to be downstream of the throttle valve 15 when the latter is at an idling position and upstream of said throtle valve when it is at a greater opening than said idling position. A conventional port provided with the intake manifold 12 for detection of the depression may be commonly used as the pressure inlet port of the pipe 11. And likewise, a conventional vacuum port provided for the speed responsive mechanism to advance the ignition system may be commonly used as the pressure inlet port 16. Provided half-way of the pipe 11 is a pressure damper 17 which is constructed by making the ends of the pipe 11 open in a casing 18 and in which a restriction 19 is provided only on the chamber 10 side pipe end. Also provided half-way of the pipe 13 is a pressure damper 20 in which a restriction 22 is provided only on the pressure inlet port 16 side of the pipe ends accommodated in a casing 21. The first switch 3 is adapted so that the contact 6 is brought into engagement with the contacts 5 against the spring 8 when the depression in the intake manifold 12 becomes higher than that during idle running, that is, higher than 600 mm. Hg for example, and the second switch 2 is so designed as to be closed when the depression acting on the pressure inlet port 16 becomes higher than 50 mm. Hg for example.

The operation will now be described below.

During idle running, the first switch 3 is opened because the depression in the intake manifold 12 is an ideling depression, and the second switch 4 is also opened because the depression acting on the pressure inlet port 16 is closed to the atmospheric pressure, as shown in the drawing. Thus, the coil 1 of the electromagnetic clutch is not energized, so that the compressor of the refrigerating apparatus is not driven by the engine.

By effecting acceleration by gradually increasing the opening of the throttle valve 15, the depression at the pressure inlet port 16 becomes higher than 50 mm. Hg, which is made to act upon the chamber 10 through the pipe 13 and pressure damper 20 thereby to close the second switch 4. Thus, the coil 1 of the electromagnetic clutch is energized so that the compressor is driven by the engine. On the other hand, if acceleration is effected by rapidly opening the throttle valve, then the depression acting at the pressure inlet port 16 becomes lower than about 50 mm. Hg, and the depression in the intake manifold 12 is also low. Thus, both the first and second switches 3 and 4 remain open so that the compressor is not driven. In case quick acceleration is started with a medium speed, the depression acting at the pressure inlet port 16 becomes considerably lower than 50 mm. Hg. Thus, the second switch 4 is opened so that the compressor is stopped from being driven.

During the high power running operation wherein the throttle valve 15 is completely opened as in the case of climbing a hill, for example, the depression acting at the pressure inlet port 16 becomes lower than about 50 mm. Hg. Thus, both of the first and second switches 3 and 4 are opened so that the compressor is not driven.

During the coasting operation wherein the throttle valve is fully closed to start deceleration with medium-high speed running, a depression lower than 50 mm. Hg is caused to act at the pressure inlet port 16, while the depression in the intake manifold 12 becomes higher than that during the idling operation, so that the first switch 3 is opened. Thus, the clutch coil 1 is maintained in the energized state so that the compressor is driven continuously even during the deceleration.

In an attempt to achieve substantially constant-speed running, the throttle valve is temporarily opened and closed in accordance with variations in the road conditions thereby to control the vehicle speed. In such case, too, the depression in the intake manifold 12 and that at the pressure inlet port 16 vary all the time. In the case where such variations are small or temporary, however, the pressure dampers 17 and 20 act to prevent these variations in the depression from being transmitted directly to the chambers 10 and 10', so that the electromagnetic clutch remains as it is.

Description will now be made of the pressure dampers 17 and 20 each constituted by a casing and restriction. The depression in the intake manifold 12 is introduced directly into the casing 18 of the pressure damper 17. Thus, during medium or high speed running, the depression introduced into the casing is relatively high, and when the automobile operated to deceleration, the depression in the chamber 10 rapidly builds up to a sufficient level to close the first switch 3. During power running, on the other hand, since the depression in the intake manifold 12 is low, the depression in the casing 18 is also low. Therefore, even if the depression in the casing 18 is temporarily increased up to a level corresponding to that for the coasting operation during gearing operation, the depression in the chamber 10 cannot be increased up to a sufficient level to close the first switch 3 due to the slow build-up thereof, coupled with the action of the restriction 19, so that the clutch is not engaged.

The pressure damper 20 is constituted by a restriction 22 provided on the pressure inlet port 16 side open end of the pipe 13. Therefore, any change in the depression at the pressure inlet port 16 is eased an then transmitted into the casing 21. On the other hand, any change in the depression in the casing 21 is quickly transmitted to the chamber 10' of the second switch. Thus, in case the throttle valve 15 is opened or closed at a high speed between the idling opening and a higher one, if the opening variation occurs very temporarily, then any resulting change in the depression is not transmitted to the casing 21. On the other hand, if the opening variation occurs continuously, then the resulting change in depression is transmitted to to the casing 21. This is effective in an attempt to perform the gear operation for the purpose of increasing the vehicle speed under the condition of light-load. In such case, the throttle valve is completely opened or closed repeatedly. Temporarily, however, the depression in the intake manifold 12 becomes higher than that during the idling operation, and the depression acting at the pressure inlet port 16 becomes lower than 50 mm. Hg. At this point, it is often the case that the depression in the intake manifold 12 is increased only temporarily so that the first switch 3 is not closed. However, since the depression at the pressure inlet port 16 is introduced into the casing 21 through the pressure damper 20 and restriction 22, the depression in the casing 21 is not quickly changed so that the second switch 4 remains closed, Thus, the compressor is uninterruptedly driven.

Furthermore, in an attempt to perform the gearing operation under the condition of heavy-load, the depression at the pressure inlet port 16 is not substantially changed even by opening and closing the throttle valve 15, while it may sometimes happen that the depression in the intake manifold 12 becomes higher than that during the idling operation. Such change in the depression in the intake manifold 12 is relatively rapidly transmitted to the casing 18, but because of the fact that the depression in the casing 18 is low prior to the gearing operation, coupled with the action of the restriction 19, it takes too long a time for the pressure in the chamber 10 to build up enough to close the switch 3. Therefore, the compressor is not driven. In the case where the depression in the intake manifold is different between during the idling operation and during the coasting operation, it is possible that the pressure damper 17 may be constituted only by the restriction 19 without providing the casing 18.

As will be appreciated from the foregoing, in the automatic control system for refrigerating apparatus, the compressor of the refrigerating apparatus is not driven when the engine assumes the idling, quick-acceleration or high-power running state and in such a state the compressor is prevented from being unnecessarily connected with the engine due to a temporary variation in depression which results from the running operation of the engine. Thus, it is possible to make the refrigerating apparatus work in the longest possible period in so far as the running performance is not deteriorated. Furthermore, the compressor and electromagnetic clutch can effectively be protected since the frequency of operations thereof is remarkably decreased.

Referring to FIG. 2, there is shown a second embodiment of the present invention, wherein the coil 1 of the electromagnetic clutch for connecting the compressor with the engine is connected with the battery 2 through a clutch relay 23, and the first and second switches 3 and 4 are connected in series with coil 24 of the clutch relay 23 through a manual switch 25. Both of the first and second switches are of the same construction as that of those provided in the aforementioned embodiment, and in the present embodiment, they are used as B contacts. Numeral 26 represents a control switch adapted to determine such conditions as the temperature in the automobile, etc., and 27 a pilot lamp. The manual switch 25 comprises a movable contact 28, open contact 29, contact 30 which is connected with the first and second switches 3 and 4, and a grounded contact 31. When the movable contact 28 is placed in engagement with the open contact 29, the compressor is always prevented from operation, while when the movable contact 28 is brought into engagement with the grounded contact 29, the compressor is controlled only by means of the control switch 26. Further, the design is made such that when the movable contact 28 is placed in engagement with the grounded contact 30, the compressor is also controlled in accordance with the running condition of the automobile and so forth, as described in the foregoing embodiment. To this end, the first and second switches 3 and 4 are inserted in the energization circuit for the coil of the electromagnetic valve associated with the compressor, in combination with other switches. Furthermore, it will be readily apparent to those skilled in the art that modifications will become possible with respect to the negative pressure dampers in so far as the intended purpose can be achieved.

What is claimed is:

1. An automatic clutch controlling system for refrigerating apparatus which is driven by an engine of an automobile through an electromagnetic clutch, comprising a coil operatively connected with said clutch for controlling said electromagnetic clutch, a power supply for said clutch coil, a circuit means connecting said clutch coil with said power supply, and first and second switch means provided in said circuit means, said first switch means being connected to an intake manifold in said engine through a manifold pressure transmitting means so as to be actuated in accordance with a depression in said intake manifold, and said second switch means being connected to a carburetor of said engine through a throttle pressure transmitting means so as to be actuated in accordance with a depression in the neighborhood of the throttle valve, whereby said electromagnetic clutch disconnects said apparatus from said engine during idling, accelerating and high-power running operations.

2. An automatic clutch controlling system according to claim 1, wherein said first switch means includes a chamber which communicates with the intake manifold through the manifold pressure transmitting means including a pipe and a pressure damper, and said second switch means also includes a chamber which communicates with a pressure inlet port of said carburetor means through the throttle pressure transmitting means including a pipe and a pressure damper, said pressure inlet port being located at such a position as to be upstream of the throttle valve when the opening of said throttle valve corresponds to that for the idling operation and downstream of said throttle valve when said opening is further increased.

3. An automatic clutch controlling system according to claim 2, wherein the pressure damper connected with said first switch means is constituted by a casing and a restriction provided on the chamber side pipe, and the pressure damper connected with said second switch means is constituted by a casing and a restriction provided on the pressure inlet port side pipe.

4. An automatic clutch controlling system according to claim 2, wherein the pressure damper connected with said first switch means is constituted by a restriction provided on the chamber side pipe, and the pressure damper connected with said second switch means is constituted by a restriction provided on the pressure inlet port side pipe.

5. An automatic clutch controlling system according to claim 6, wherein said first switch means is opened or closed according to whether substantially the depression in the intake manifold becomes higher than the level corresponding to that during the idling operation of the automobile, and said second switch means is opened or closed according to whether substantially the depression occurring in the neighborhood of the throttle valve of the carburetor becomes slightly lower than the atmospheric pressure.

References Cited

UNITED STATES PATENTS

| 3,186,184 | 6/1965 | Pruitt | 62—323X |
| 3,459,006 | 8/1969 | Hoyer | 62—323X |

WILLIAM E. WAYNER, Primary Examiner

U.S. Cl. X.R.

62—323; 123—198; 200—81.4